United States Patent
DeHart

(10) Patent No.: US 6,618,928 B1
(45) Date of Patent: Sep. 16, 2003

(54) METHOD FOR LOADING SLOT CELL INSULATORS INTO A STATOR CORE

(75) Inventor: Hobart DeHart, Austin, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/409,486

(22) Filed: Dec. 27, 1999

Related U.S. Application Data

(62) Division of application No. 09/104,662, filed on Jun. 25, 1998, now Pat. No. 6,065,204.

(51) Int. Cl.⁷ ............................................. H02K 15/06
(52) U.S. Cl. ..................... 29/596; 598/732; 598/734; 598/606; 310/214; 310/215
(58) Field of Search .................... 29/596, 734, 736, 29/732, 598, 733; 310/272, 214, 215, 260, 270

(56) References Cited

U.S. PATENT DOCUMENTS

| | | | | |
|---|---|---|---|---|
| 3,694,887 A | * | 10/1972 | Walker et al. | 29/205 E |
| 3,745,394 A | * | 7/1973 | Mason | 310/214 |
| 4,151,436 A | * | 4/1979 | Smith | 310/215 |
| 4,594,775 A | * | 6/1986 | Stanley | 29/736 |
| 4,641,421 A | * | 2/1987 | Stanley | 29/596 |
| 5,306,976 A | * | 4/1994 | Beckman | 310/215 |
| 5,553,372 A | * | 9/1996 | Tsugawa et al. | 29/734 |
| 6,065,204 A | * | 5/2000 | DeHart | 29/734 |

FOREIGN PATENT DOCUMENTS

| | | | | |
|---|---|---|---|---|
| JP | 60046754 A | * | 3/1985 | 310/272 |
| JP | 60046755 A | * | 3/1985 | 29/596 |

* cited by examiner

Primary Examiner—Carl J. Arbes
Assistant Examiner—Minh Trinh
(74) Attorney, Agent, or Firm—Amin & Turocy; Alexander M. Gerasimow; William R. Walbrun

(57) ABSTRACT

A method for loading slot cell insulators into a plurality of slots in a stator core of a dynamoelectric machine is disclosed. The method includes forming a slot cell insulator having a generally U-shape cross-section. The slot cell insulator may be turned so that an open end of the generally U-shape slot cell insulator face a loading assembly. The slot cell insulator is moved into the loading assembly. The forming and moving are repeated until a plurality of slot cell insulators are stored in the loading assembly. The plurality of slot cell insulators are pushed from the loading assembly into the slots of the stator core.

13 Claims, 4 Drawing Sheets

METHOD FOR LOADING SLOT CELL INSULATORS INTO A STATOR CORE

This application is a divisional of application Ser. No. 09/104,662 filed Jun. 25, 1998, now U.S. Pat. No. 6,065,204, issued May 22, 2000.

FIELD OF THE INVENTION

The present invention generally relates to electrical insulators for magnetic cores, and more particularly, to a system and a method for placing slot cell insulators into stator cores of dynamoelectric machines.

BACKGROUND OF THE INVENTION

Dynamoelectric machines, such as electric motors and generators, include stator cores which generally are formed of a plurality of steel laminations bonded together to form a hollow cylinder having a pair of end faces spaced apart a longitudinal distance referred to as the stack height. A plurality of teeth extend from an inner cylindrical surface of the core into a hollow center portion. The teeth form slots between adjacent teeth that extend the length or the height of the core.

Electrical conductors are disposed in the slots to react to or to generate electromagnetic fields. Generally, the conductors are coils of wire wrapped around the teeth and through the slots in a winding pattern. In an electric motor, for example, energizing the coils generates an electromagnetic field in the core to rotate a rotatable assembly in the center portion of the core. To generate the electromagnetic field and to prevent shorting, the core is electrically insulated from the coils of wire. One desirable approach is the employment of slot cell insulators fabricated from suitable insulating or dielectric material.

One type of slot cell insulator is formed by folding opposite ends of a piece of relatively thin dielectric material upon itself along parallel fold lines extending across a width of the material to form two end portions of at least double thickness dielectric material. This piece of material is then folded lengthwise along a longitudinal fold line extending approximately through the center of the material with the folded end portions on the outside. In use, a center portion of the insulator lines the walls of the slots in the stator core and prevents contact between the conductors and the stator core. The folded-over end portions form cuffs which engage respective opposite end faces of the stator core when the insulator is placed in the slot. The cuffs help the insulators remain within the slots in the stator core.

One method of inserting slot cell insulators into a stator core includes a device having a crank and slider mechanism for driving a push rod. The push rod engages a cuffed end of an insulator and longitudinally pushes the insulator past an end face and into a slot in the stator core. This method requires incrementally, rotatably indexing the stator core to position each slot to receive an insulator. Indexing the stator core to the precise position accurately and consistently is difficult, however. If the stator core is not positioned precisely, the insulator may catch on the end face adjacent the slot as the insulator is inserted.

Not only is this a slow process, but the device is difficult to adjust for different lengths of insulators used in stator cores having a different stack height. Often an entirely new device must be substituted. Furthermore, in this type of device the insulators cannot be formed until a stator core can receive them, thus the device is idle between stator cores.

In addition, the slider-crank mechanism requires an extensive amount of maintenance to ensure precise positioning of the insulator in the slot. Inserting one insulator at a time also means that incrementally rotating the stator core through three hundred and sixty degrees holds the stator core at a slot cell insulator inserting station on an assembly line for a long time.

Another problem with the prior insulator insertion devices is that sometimes on one side of the longitudinal fold in the insulator there is more material than on the other side of the longitudinal fold and thus the longitudinal side edges do not line up evenly. As a result, when the insulator is placed into a slot in the stator core, a portion of the tooth or other part of the stator core is exposed and the chances for a short circuit increase.

SUMMARY OF THE INVENTION

The present invention concerns a system and a method for loading slot cell insulators into a stator core of a dynamoelectric machine. According to one aspect of the invention, the system includes a forming assembly, a transfer mechanism and a loading assembly. The forming assembly forms the slot cell insulators from electrically insulating sheet material. The transfer mechanism transfers the insulators from the forming assembly to the loading assembly. In moving the insulators from the transfer mechanism to the loading assembly, the longitudinal side edges of the insulator automatically even up, for example, as is explained below. When the loading assembly is full and the stator core is in position, the loading assembly simultaneously loads the insulators into slots extending the length of the stator core. The system forms slot cell insulators substantially continuously and stores them in the loading assembly. When the stator core is ready to receive the insulators, the loading assembly simultaneously loads the insulators into the slots in the stator core. Thus, the system and method according to the present invention load slot cell insulators into the slots of a stator core with improved efficiency.

According to one aspect of the invention, the system includes a forming assembly which forms a slot cell insulator having a generally U-shape cross-section. The system also includes a loading assembly which stores the slot cell insulator. A transfer mechanism is interposed between the forming assembly and the loading assembly to transfer the slot cell insulator from the forming assembly to the loading assembly. The loading assembly is adapted to store and subsequently to load simultaneously a plurality of slot cell insulators into the slots in the stator core.

According to another aspect of the invention, the method includes forming a slot cell insulator having a generally U-shape cross-section; turning the slot cell insulator so that an open end of the generally U-shape slot cell insulator faces a loading assembly; moving the turned slot cell insulator into the loading assembly; repeatedly forming, turning and moving slot cell insulators until a plurality of slot cell insulators are stored in the loading assembly; and pushing the plurality of slot cell insulators simultaneously from the loading assembly into the slots of the stator core.

According to another aspect of the invention, the system includes a means for forming a slot cell insulator having a generally U-shape cross-section; a means for storing the slot cell insulator; a means for transferring the slot cell insulator from the forming means to the storing means; and a means for simultaneously loading a plurality of slot cell insulators from the storing means into the slots in the stator core.

According to yet another aspect of the invention, the system includes a forming assembly which forms a slot cell insulator having a generally U-shape cross-section; a loading assembly which stores the slot cell insulator in a cartridge; and a transfer mechanism interposed between the forming assembly and the loading assembly to rotate the slot cell insulator one hundred and eighty degrees. The transfer mechanism includes a shuttle plate which cooperates with the forming assembly to transfer the slot cell insulator from the forming assembly to the loading assembly. Furthermore, the loading assembly is adapted to store and subsequently to load simultaneously a plurality of slot cell insulators into the slots in the stator core.

These and other features of the invention are fully described and particularly pointed out in the claims. The following description and annexed drawings set forth in detail one illustrative embodiment of the invention, this embodiment being indicative of but one of the various ways in which the principles of the invention may be employed.

DETAILED DESCRIPTION OF THE INVENTION

Figure 1:
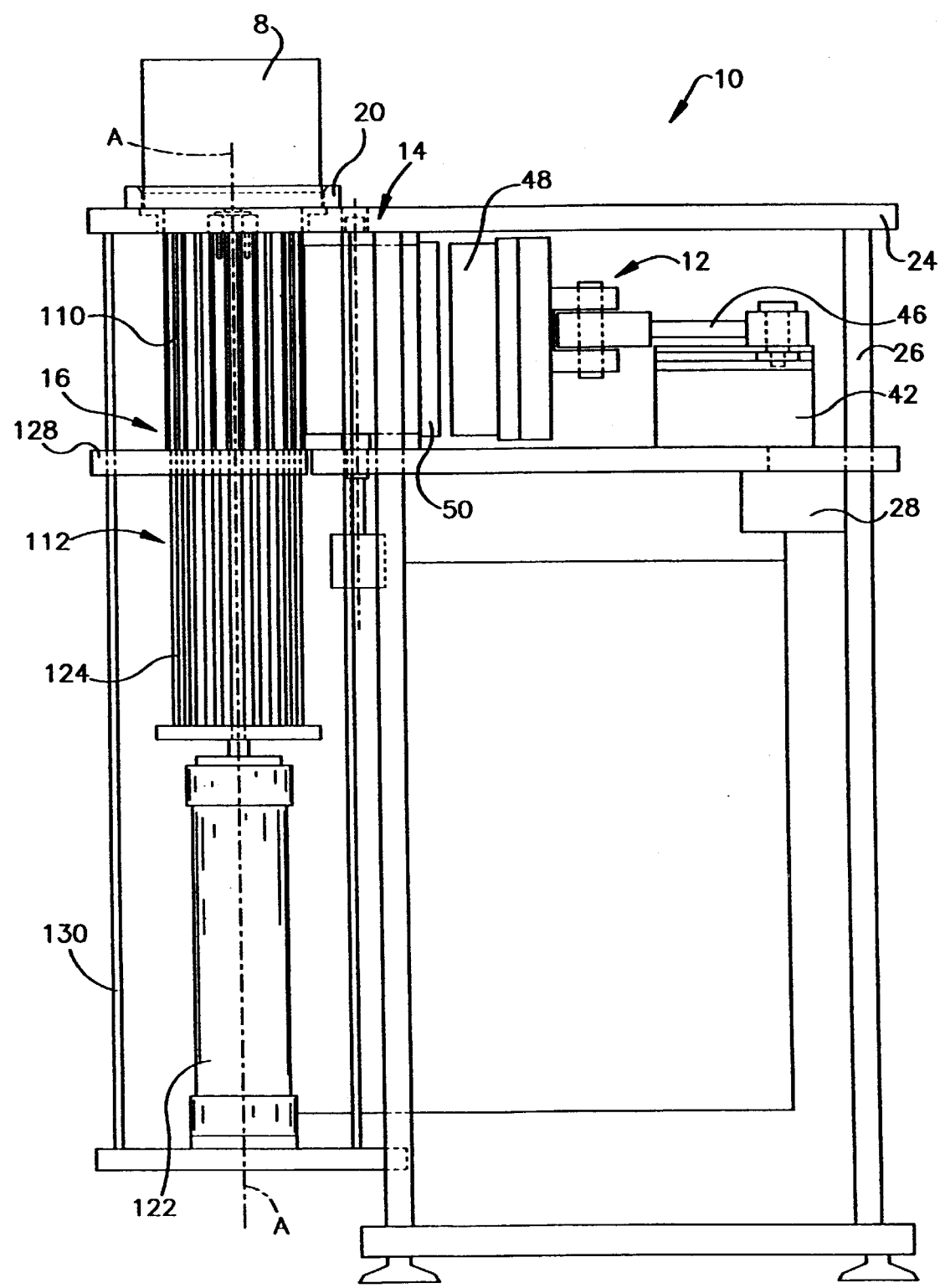
FIG. 1 is a side elevational view of the system according to the invention for loading slot cell insulators into slots in a stator core, the system including a forming assembly, a transfer mechanism and a loading assembly.
Figure 2:
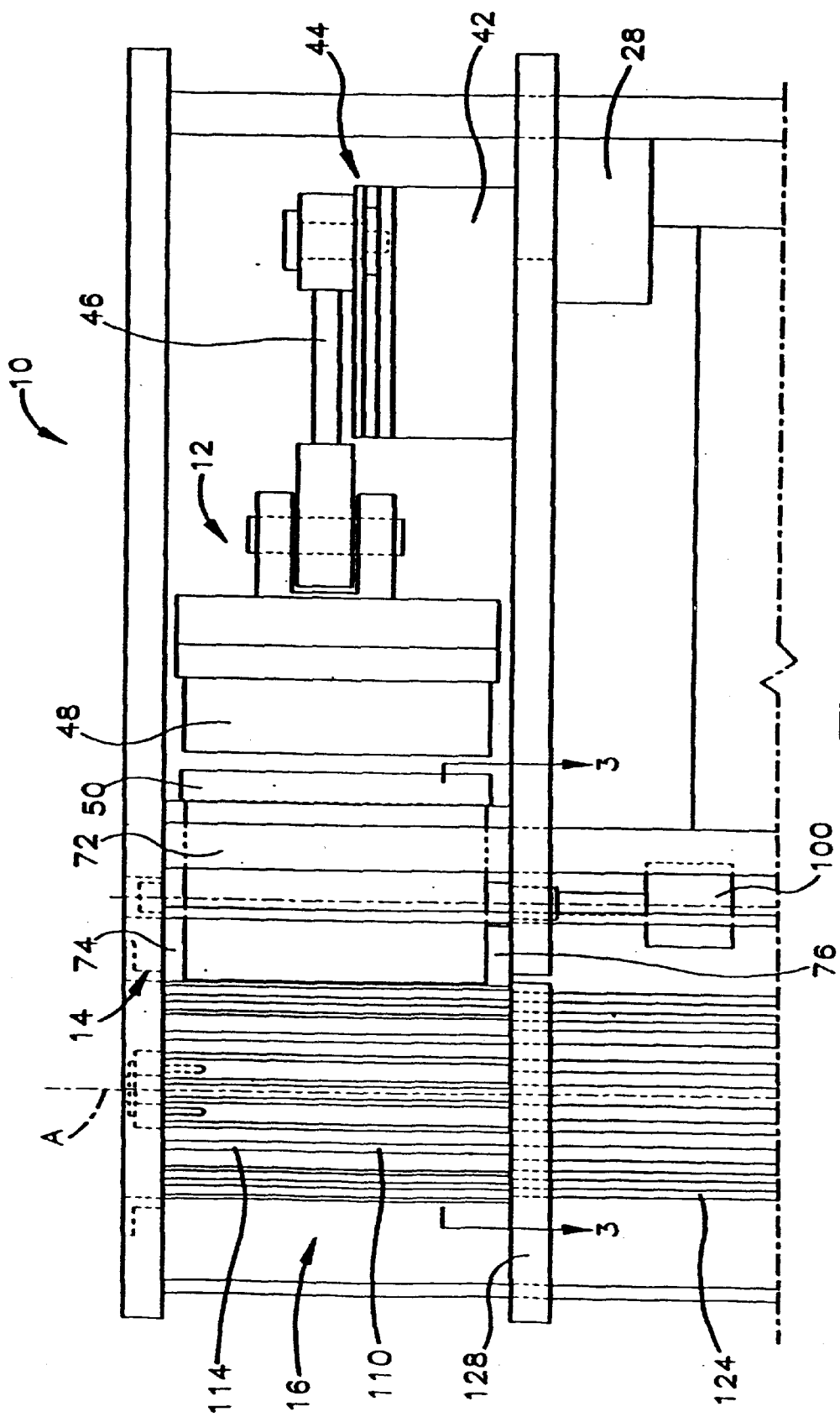
FIG. 2 is an enlarged side view of a portion of FIG. 1, including the forming assembly, the transfer mechanism and part of the loading assembly.

Referring to the drawings and initially to FIGS. 1 and 2, the present invention includes a system and method for loading slot cell insulators into a stator core 8 of a dynamoelectric machine. The system 10 includes a forming assembly 12, a transfer mechanism 14 and a loading assembly 16. The forming assembly forms the slot cell insulators, also known as slot liners, and the transfer mechanism transfers the slot liners from the forming assembly to the loading assembly, evening up, as is explained further below, opposing longitudinal side edges (sometimes referred to as distal edges relative to a longitudinal fold) of the slot liners in the process. The loading assembly stores and then subsequently simultaneously loads a plurality of slot liners into slots in the stator core. Accordingly, the forming assembly forms slot liners substantially continuously, pausing only when the loading assembly is full and when the loading assembly loads the slot liners into the stator core, thereby providing the system and method according to the invention with increased speed and efficiency.

In the illustrated embodiment of the invention, the stator core 8 is mounted on a pallet 20 for movement along an assembly line which includes the system 10. The system 10 includes a main frame 22 having horizontal and vertical frame members 24 and 26, respectively, which support the forming assembly 12, the transfer mechanism 14 and the loading assembly 16, as well as a controller 28.

The controller 28 controls and coordinates the operations of the forming assembly 12, the transfer mechanism 14 and the loading assembly 16, as is described in detail below. The controller 28 also may include sensors (not shown) for sensing operational states of the system 10 and output devices (not shown) for displaying and recording operational states of the system 10 10. Operational states of interest may include the status of a supply of dielectric material used to make slot liners, status and positions of the various components, model numbers corresponding to the stator core 8, and malfunction situations, for example.

Figure 4:
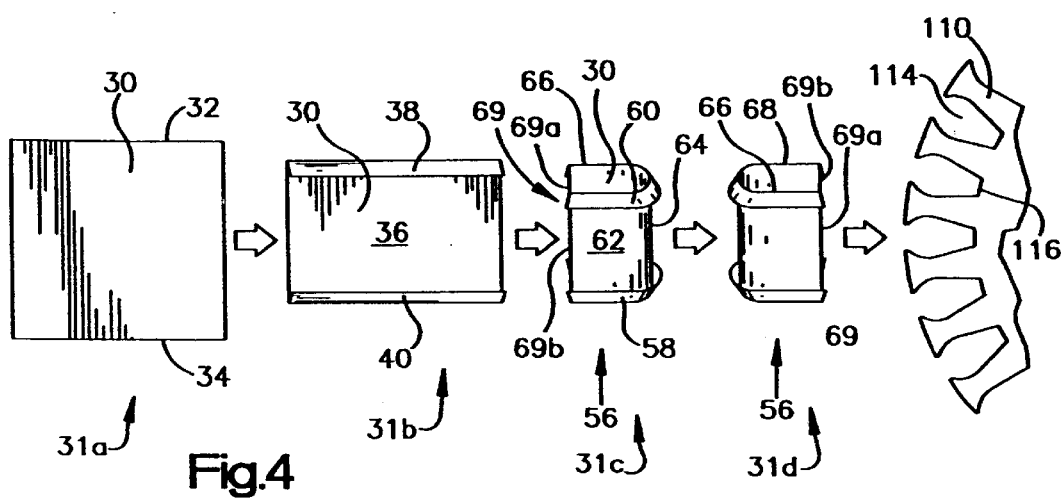
FIG. 4 is a sequential schematic illustration showing the formation of the slot cell insulator and its movement through the forming assembly and the transfer mechanism to the cartridge.

Referring briefly to FIGS. 1 and 4, the forming assembly 12 forms the slot liners from a continuous elongated strip or sheet 30 of dielectric material which is delivered to the forming assembly 12 in a well known manner. The sheet 30 is shown at several steps 31a, 31b, 31c, and 31d in the sequential schematic illustration of FIG. 4. The sheet 30, as shown at stage 31a includes opposing top and bottom edges 32 and 34. The forming assembly 12 includes forming members (not shown) which fold the top and bottom edges 32 and 34 of the sheet 30 of dielectric material toward each other and toward a center portion 36 of one side of the sheet 30. The forming members then crease the folded edges 32 and 34 to form top and bottom cuffed end portions (also referred to as cuffs) 38 and 40 in a well known manner to form a cuffed sheet of dielectric material 30 as shown at stage 31b of FIG. 4.

Figure 3:
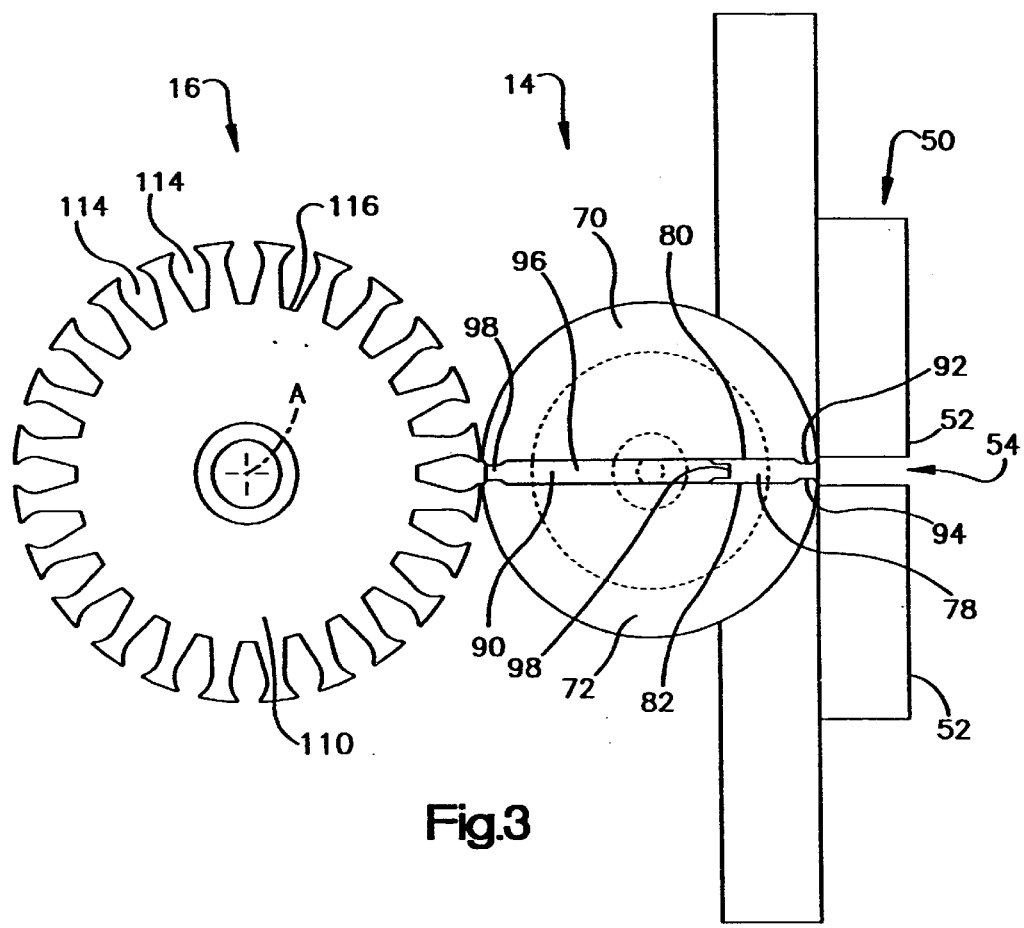
FIG. 3 is a partial schematic top view showing portions of the forming assembly, the transfer mechanism and the loading assembly, as seen along the line 3—3 of FIG. 2.

Referring now to FIGS. 2 and 3, the forming assembly 12 includes a crank motor 42, a crank 44, a connecting arm 46, a punch 48 and a die 50. The crank motor 42 turns the crank 44, the crank 44 drives the connecting arm 46, and the connecting arm 46 converts the rotational motion of the crank 44 into reciprocating lineal motion in the punch 48. The punch 48 cooperates with the die 50 which has a flat face 52 adjacent an opening 54 facing the punch 48 that is sized to receive the punch 48 (see FIG. 3). The punch 48 and the edges of the opening 54 cooperate to sever a section of the cuffed sheet of dielectric material 30. The width dimension of the punch 48 and the opening 54 is approximately the width of the severed section of dielectric material 30.

The punch 48 and the die 50 (FIG. 2) also longitudinally fold or bend the severed dielectric material into a generally U-shape to form a slot liner 56 as shown at stage 31c in FIG. 4. The slot liner 56 has cuffed top and bottom end portions or cuffs 58 and 60 with the cuffs facing outwardly. The slot liner 56 also has a center portion 62. The end portions 58 and 60 and the center portion 62 are folded along a longitudinal fold line 64 at the base of the "U" and a pair of side arm portions 66 and 68 extend from the fold line so that an open end 69 of the slot liner 56 will face the loading assembly 16. The height of the slot liner 56 is measured along the longitudinal fold line 64. The punch 48 (FIG. 2) pushes the slot liner 56 into the transfer mechanism 14 (FIG. 2) as the cuffed sheet 30 of dielectric material is folded. Although one form of slot liner is illustrated in the figures and described herein, alternatively other types of slot liners may be used with the system and method of the invention.

Although in the illustrated embodiment the punch 48 and the die 50 perform dual functions of severing and longitudinally folding the sheet 30 of dielectric material to form the slot liner 56, the severing and folding steps may be performed by separate elements. For example, a knife may sever the dielectric material from the sheet 30 (FIG. 4) and then the punch 48 and the die 50 (FIG. 2), or a similar device, may longitudinally fold the sheet 30 of dielectric material and push the slot liner 56 into the transfer mechanism 14.

Referring again to FIG. 2, as the crank motor 42 turns the crank 44 through three hundred and sixty degrees, the punch 48 moves from a starting position away from the die 50 to a forming position in the transfer mechanism 14 and back to the starting position. Although not shown, the forming assembly 12 also may include guide members to guide the punch 48 as it oscillates between the starting position and the forming position in the transfer mechanism 14.

As shown in FIGS. 2–4, the transfer mechanism 14 has a pair of spaced apart side members 70 and 72 connected through an upper cap plate 74 and a lower base plate 76 to form a passage or guide channel 78 having a width approximate the width of the slot liner 56 as measured between the distal ends 69a and 69b of the side arm portions 66 and 68. The guide channel 78 has a height at least as great as the height of the slot liner 56 as measured along the longitudinal fold line 64.

In the illustrated embodiment, the side members 70 and 72 are mirror-image hemiscylinders. The hemicylindrical side members 70 and 72 have substantially flat faces 80 and 82, respectively, oriented toward and parallel to each other to form sides of the guide channel 78. The cap plate 74 and the base plate 76 are circular and sandwich the side members 70 and 72 therebetween to form the top and the bottom of the guide channel 78, respectively.

The transfer mechanism 14 also includes a shuttle plate 90 contained within the guide channel 78. The shuttle plate 90 is substantially rectangular and is slightly smaller than the guide channel 78 for movement along the length of the guide channel 78. The length of the guide channel 78 not filled by the shuttle plate 90 is approximately the length of the slot liner 56 as measured from the longitudinal fold line 64 to a distal end of one of the side arm portions 66 or 68.

Furthermore, the hemicylindrical side members 70 and 72 have protrusions 92 and 94 which extend from the flat faces 74 and 76, respectively, toward each other across the guide channel 78 at each open end of the guide channel 78. The protrusions 92 and 94 narrow the guide channel 78 at the open ends to retain the shuttle plate 90 within the guide channel. The shuttle plate 90 has a central portion 96 and narrower end portions 98. The intersections between the central portion 96 and the end portions 98 form shoulders which engage the protrusions 92 and 94 as the shuttle plate 90 moves to each of the opposing ends of the guide channel 78. At each of the open ends of the guide channel 78 the narrow portions of the shuttle plate 90 extend past the protrusions 92 and 94 with the distal end of the narrow end portion 98 lying substantially flush with surfaces of the side members 70 and 72 outside and adjacent the end of the guide channel 78, as shown in FIG. 3.

A transfer motor 100 is connected to the transfer mechanism 14 and is synchronized to turn or to rotate the transfer mechanism 14 about an axis passing through the center of the guide channel 78 parallel to the flat faces 80 and 82 and along the height dimension of the side members 70 and 72, i.e., a vertical axis A in several figures in the illustrated embodiment. The axis A also is parallel to the longitudinal fold line 64 (FIG. 4) of a slot liner 56 in the guide channel 78. The transfer mechanism 14 rotates one hundred and eighty degrees for every three hundred and sixty degree rotation of the crank motor 42. The crank motor 42 and the transfer motor 100 are stepper motors, although other types of motor may be used. Furthermore, instead of two motors, a single motor may be used with an appropriate linkage to drive the entire system 10.

Figure 5:
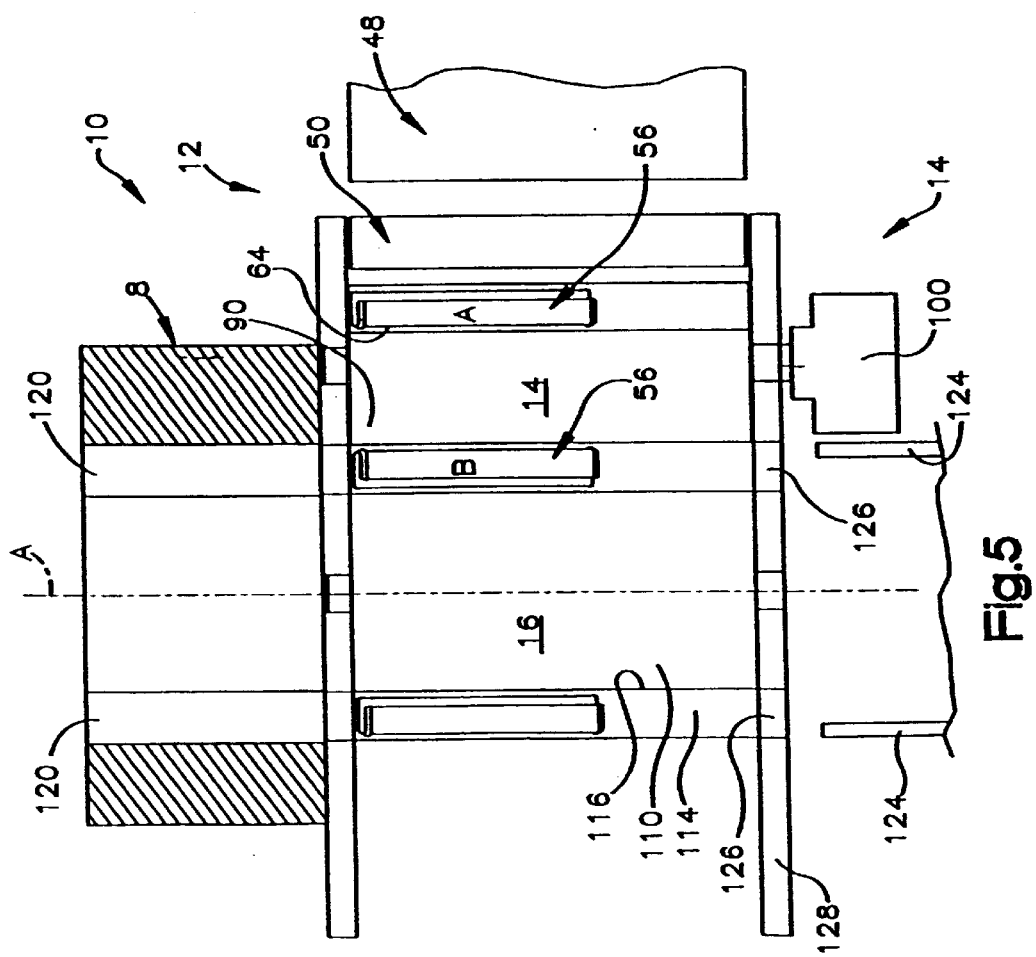
FIG. 5 is a schematic side view of a portion of the system in operation.

As illustrated in FIG. 5, as the punch 48 enters the transfer mechanism 14, it pushes the slot liner 56 (in position A) into the guide channel 78 (FIG. 3) with the longitudinal fold line 64 against the shuttle plate 90. The natural resiliency of the dielectric material causes the distal ends of the side arm portions 66 and 68 (FIG. 4) to spring outward against the flat faces 74 and 76 behind the protrusions 92 and 94 (see FIG. 3). Thus, as the punch 48 withdraws from the transfer mechanism 14 the protrusions 92 and 94 retain the slot liner 56 within the guide channel 78.

As shown in FIGS. 4 and 5, the transfer mechanism 14 turns, rotates or flips the slot liner 56 one hundred and eighty degrees to the position of a turned slot liner 56 (shown at stage 31d in FIG. 4) so that the open end 69 of the turned slot liner 56 faces the loading assembly 16. As the punch 48 pushes the next slot liner 56 into the transfer mechanism 14 at an open end of the guide channel 78 (in position A), the punch 48 simultaneously pushes the shuttle plate 90 to the opposite end of the guide channel 78 (FIG. 3). The movement of the shuttle plate 90 pushes the turned slot liner 56 out of the guide channel 78 and into the loading assembly 16 (in position B). Accordingly, the inner edges of the protrusions 92 and 94 (FIG. 3) preferably are rounded so that the distal ends 96a and 96b of the side arm portions 66 and 68 (FIG. 4) of the slot liner 56 ride up and over the protrusions 92 and 94 as the shuttle plate 90 passes the slot liner 56 to the loading assembly 16.

Referring to FIGS. 1–3, the loading assembly 16 includes a cartridge 110 and a pusher 112. In the illustrated embodiment, the cartridge 110 is substantially cylindrical with a plurality of recesses 114 spaced circumferentially around its outer surface and opening thereto. The recesses 114 extend longitudinally along the entire height of the cartridge 110 and have a substantially flat back surface 116 which is perpendicular to a radius of the cartridge 110.

The stator core 8 has a plurality of slots 120 into which the slot liners 56 are inserted, as shown in FIG. 5, for example. The recesses 114 generally have the same cross-sectional shape as the slots 120 in the stator core 8, except that the slots 120 in the stator core 8 open toward the center of the stator core 8 and the recesses 114 open to the outside of the cartridge 110, away from the center (see FIG. 5).

As shown in FIGS. 1 and 2, the cartridge 110 is connected to an index motor (not shown) for indexed rotation synchronized with the rotation of the transfer mechanism 14. The index motor is connected to the controller 28 which controls and coordinates the operation of the index motor relative to the forming assembly 12 and the transfer mechanism 14. More specifically, for each one hundred and eighty degree rotation of the transfer mechanism 14, the cartridge 110 rotates through a distance equal to three hundred and sixty degrees divided by the number of recesses 114. Thus, every time the crank motor 42 rotates three hundred and sixty degrees, the transfer mechanism 14 rotates one hundred and eighty degrees, the guide channel 78 is aligned with the opening 54 in the die 50 and with a recess 114 in the cartridge 110, as shown in FIG. 3, to fill each recess 114 with a slot liner 56.

As shown in FIGS. 1, 2 and 5, the pusher 112 includes a pneumatic piston 122 and a plurality of parallel pusher rods 124 connected to the pneumatic piston 122. Although a pneumatic piston 122 is shown in the illustrated embodiment, alternate motive means may be used in place of the pneumatic piston 122, including a solenoid or a screw drive. The pneumatic piston 122 moves the pusher rods 124 up through the recesses 114 in the cartridge 110 to push the slot liners 56 into the stator core 8.

As will be readily understood, the number of pusher rods 124 corresponds to the number of recesses 114 in the cartridge 110 which also correspond to the number of slots 120 in the stator core 8 (see FIG. 5). The pusher rods 124 have substantially the same cross-section as the recesses 114 in the cartridge 110, although other shapes of pusher rods 124 may be used. Furthermore, the pusher rods 124 are axially aligned with the recesses 114 in the cartridge 110, and in the illustrated embodiment openings 126 in a plate 128 under the cartridge 110 act as guides to guide distal ends of the pusher rods 124 into the recesses 114. Furthermore, when the stator core 8 is positioned to receive the slot liners 56 from the loading assembly 16, the slots 120 in the stator core 8 are axially aligned with the recesses 114 in the cartridge 110.

Referring to FIGS. 4 and 5, as a slot liner 102 moves into a recess 114 in the cartridge 110, if the distal edge 69*a* or 69*b* of one side arm portion 66 or 68 of the generally U-shape slot liner 56 is not even with the opposing distal edge 69*a* or 69*b*, (in other words if the amount of dielectric material on each side of the longitudinal fold line 64 is uneven) a leading distal edge will bottom out in the recess 114 and continued motion of the slot liner 56 into the recess 114 will cause the other distal edge to even up. In other words, the leading distal edge 69*a* or 69*b* of the slot liner 56 will contact the back surface 116 of the recess 114 and as the slot liner 56 continues to move into the recess 114, the opposing distal edge 69*a* or 69*b* also will contact the back surface 116 of the recess 114 so that the distal edges 69*a* and 69*b* are even or aligned with each other.

Figure 6:
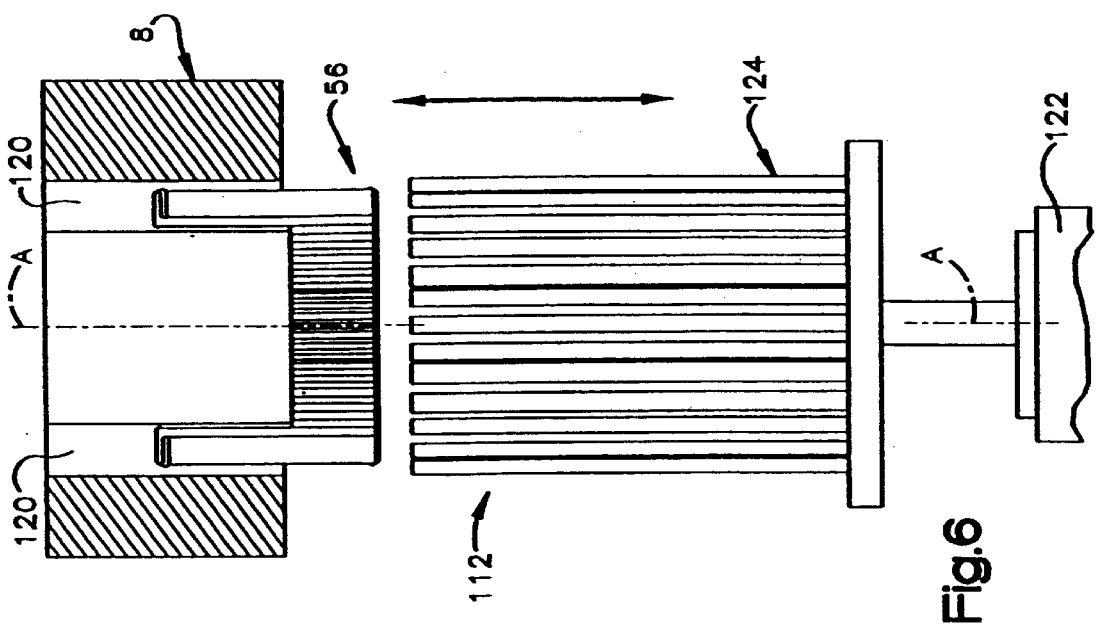
FIG. 6 is a schematic side view of a portion of the loading assembly illustrating the loading of insulators into the stator core.

In operation, the pneumatic piston 122 moves the pusher rods 124 through the openings 126 in the plate 128 a predetermined distance into the recesses 114 in the cartridge 110 to load the slot liners 56 into the stator core 8, as shown in FIGS. 5 and 6. The distal ends of the pusher rods 126 engage the cuffed end portions 58 (FIG. 4) of the slot liners 56 and push the slot liners 56 into the slots 120. Since the cartridge 110 holds a plurality of slot liners 56 and the pusher 112 has an equal number of pusher rods 124, all of the slot liners 56 are loaded into the stator core 8 simultaneously, thus reducing the amount of time that the stator core 8 needs to be in position to receive slot liners 56. Furthermore, the loading assembly 16 loads the slot liners 56 into the stator core 8 with the distal edges 69*a* and 69*b* of the side arm portions 66 and 68 aligned and uniform, thus reducing the amount of time required for quality control inspections and adjustments of the slot liners 56.

As shown in FIG. 1, the loading assembly 16 is mounted on a detachable frame 130 which is detachable from the main frame 22. Thus the loading assembly 16 is easily replaced with another loading assembly 16 having a different cartridge 110 and/or a different length of pusher rods 124 to accommodate stator cores 8 having a different number of slots 120, different shaped slots and/or a different stack height, for example (see FIGS. 5 and 6).

Referring now to FIGS. 3–6, the overall operation of the system 10 will be summarized. First, the forming assembly 12 advances the sheet 30 of dielectric material (31*a* in FIG. 4) and folds and creases the top and bottom edges 32 and 34 to form the cuffed end portions 38 and 40 (31*b* in FIG. 4). The punch 48 and the die 50 cooperate to sever a section of the sheet 30 of dielectric material and longitudinally fold the cuffed sheet 30 into a generally U-shape to form the slot liner 56 (31*c* in FIG. 4). The punch 48 continues to move and thereby moves the slot liner 56 longitudinal fold first into an open end 54 of the guide channel 78 (FIG. 3) in the transfer mechanism 14. The punch 48 simultaneously moves the shuttle plate 90 to the opposite open end of the guide channel 78. Subsequently, as the punch 48 retracts from the guide channel 78 and the protrusions 92 and 94 (FIG. 3) retain the slot liner 56 in the guide channel 78. After the punch 48 exits the guide channel 78 the transfer motor 100 rotates the transfer mechanism 14 one hundred and eighty degrees about an axis parallel to the longitudinal fold line 64 in the slot liner 56. The guide channel 78 is thereby positioned to receive the next slot liner 56 and is aligned with a recess 114 in the cartridge 110 of the loading assembly 16. As the punch 48 pushes the next slot liner 56 into the guide channel 78 in position A (FIG. 5), it simultaneously moves the shuttle plate 90 which in turn pushes the first-mentioned slot liner 56 into the recess 114 in position B. The distal edges 69*a* and 69*b* of the side arm portions 66 and 68 of the slot liner 56 are evened up against the back surface 116 of the recess 114. After the punch 48 withdraws from the guide channel 78, the transfer mechanism 14 rotates another one hundred and eighty degrees and the cartridge 110 indexes one position to align the next recess 114 with the guide channel 78. This process continues until all of the recesses 114 in the cartridge 110 are full of slot liners 56.

Once the cartridge 110 is full, the forming assembly 12 and the transfer mechanism 14 pause and temporarily cease operation. When the stator core 8 is positioned to receive the slot liners 56 from the loading assembly 16, the pneumatic piston 122 (FIG. 6) activates and extends the pusher rods 124 through the recesses 114 in the cartridge 110 to load simultaneously the slot liners 56 into the slots 120 of the stator core 8. As soon as the pusher rods 124 withdraw from the cartridge 110, the forming assembly 12 and the transfer mechanism 14 begin refilling the cartridge 110 with slot liners 56 to be used to fill the next stator core.

Thus the system 10 forms slot liners 56 and fills the cartridge 110 almost continuously without waiting for the stator core 8 to be ready to receive slot liners 56. As a result, once a stator core is in position to receive the slot liners, the slot liners are loaded within a short period of time. In addition, a plurality of slot liners are loaded simultaneously, the slot liners do not have to be inserted as quickly as when the slot liners were inserted one at a time. Even with a slow insertion, the system 10 reduces the amount of time the stator core has to be in position to receive slot liners.

Furthermore, the transfer mechanism 14 and the cartridge 110 cooperate to align the distal edges 69*a* and 69*b* of the generally U-shape slot liner 56 prior to their insertion in the stator core 8, thereby improving the efficiency of loading the slot liners and reducing the time needed for inspection and corrective action. Accordingly, the present invention provides significant improvements over prior art systems and methods for loading slot liners into a stator core.

Although the invention has been shown and described with respect to a certain preferred embodiment or embodiments, equivalent alterations and modifications will occur to others skilled in the art upon the needing and understanding of this specification and the annexed drawings. In particular to the various functions performed by the above-described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, if any, as may be desired and advantageous for any given or particular application.

What is claimed is:

1. A method for loading slot cell insulators into a plurality of slots in a stator core of a dynamoelectric machine, comprising:

forming a slot cell insulator having a generally U-shape cross-section;

turning the slot cell insulator so that an open end of the generally U-shape slot cell insulator face a loading assembly;

moving the turned slot cell insulator into the loading assembly;

repeatedly forming, turning and moving slot cell insulators until a plurality of slot cell insulators are stored in the loading assembly; and pushing the plurality of slot cell insulators simultaneously from the loading assembly into the slots of the stator core.

2. The method of claim 1, wherein the turning step includes turning the slot cell insulator one hundred and eighty degrees.

3. The method of claim 1, wherein the turning step includes rotating the slot cell insulator about an axis parallel to a longitudinal fold line at a base of the generally U-shape insulator.

4. The method of claim 3, wherein the forming step includes using a punch and a die to sever and to fold the slot cell insulator.

5. The method of claim 1, wherein the forming step includes forming at least one cuff along an edge of an elongated strip of dielectric material; severing a section of cuffed dielectric material from the strip; and folding a piece of insulating material about a longitudinal fold line to form the generally U-shape slot cell insulator with the cuff on an outer side.

6. The method of claim 1, wherein the forming step includes moving the slot cell insulator into a transfer mechanism and wherein the turning step includes turning by the transfer mechanism.

7. A method of claim 1, wherein the steps of forming and moving occur simultaneously.

8. The method of claim 1, wherein the moving step includes moving the turned slot cell insulator into a radially outwardly opening recess in a cartridge having a plurality of recesses, each recess having a flat back wall which is perpendicular to a radius of the cartridge, and the moving step includes evening up distal ends of the generally U-shape slot cell insulator against the back wall of the recess.

9. The method of claim 8, further comprising indexing the cartridge a distance calculated as three hundred and sixty degrees divided by the number of recesses for each turning step.

10. The method of claim 9, wherein the pushing step includes simultaneously pushing a plurality of slot cell insulators into the slots of the stator core with a plurality of pusher rods.

11. The method of claim 10, wherein the pushing step includes energizing a pneumatic piston to move the pusher rods which push the slot cell insulators into the stator core.

12. The method of claim 11, further comprising coordinating the steps of forming, turning, pushing and indexing.

13. A method for loading slot cell insulators into a plurality of slots in a stator core of a dynamoelectric machine, comprising:

forming a slot cell insulator having a generally U-shape cross-section and turning the slot cell insulator to face a loading assembly;

moving the turned slot cell insulator into a loading assembly;

repeatedly forming and moving slot cell insulators until a plurality of slot cell insulators are stored in the loading assembly; and pushing the plurality of slot cell insulators from the loading assembly into the slots of the stator core.

* * * * *